United States Patent
Iwamoto et al.

(10) Patent No.: US 9,239,850 B2
(45) Date of Patent: Jan. 19, 2016

(54) FEATURE DESCRIPTOR ENCODING APPARATUS, FEATURE DESCRIPTOR ENCODING METHOD, AND PROGRAM

(71) Applicant: NEC Corporation, Tokyo (JP)

(72) Inventors: Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/359,229

(22) PCT Filed: Nov. 15, 2012

(86) PCT No.: PCT/JP2012/079676
§ 371 (c)(1),
(2) Date: May 19, 2014

(87) PCT Pub. No.: WO2013/073624
PCT Pub. Date: May 23, 2013

(65) Prior Publication Data
US 2014/0321765 A1 Oct. 30, 2014

(30) Foreign Application Priority Data
Nov. 18, 2011 (JP) .................................. 2011-253225

(51) Int. Cl.
*G06K 9/36* (2006.01)
*G06K 9/46* (2006.01)
(Continued)

(52) U.S. Cl.
CPC ...... *G06F 17/3028* (2013.01); *G06F 17/30247* (2013.01); *G06K 9/4642* (2013.01); *G06T 9/00* (2013.01); *H04N 19/54* (2014.11)

(58) Field of Classification Search
None
See application file for complete search history.

(56) References Cited

U.S. PATENT DOCUMENTS 4,606,069 A * 8/1986 Johnsen ............... H04N 1/4115
382/218
4,974,078 A * 11/1990 Tsai ....................... H04N 9/045
348/E9.01

(Continued)

FOREIGN PATENT DOCUMENTS

EP 2405391 A1 1/2012
JP 2009-169884 A 7/2009

(Continued)

OTHER PUBLICATIONS

International Search Report Corresponding to PCT/JP2012/079676, Jan. 15, 2013, 1 page.

(Continued)

*Primary Examiner* — Bhavesh Mehta
*Assistant Examiner* — Feng Niu
(74) *Attorney, Agent, or Firm* — Wilmer Cutler Pickering Hale and Dorr LLP (57) ABSTRACT

An object of the present invention is to reduce the size of encoded feature descriptors. A feature descriptor encoding apparatus includes a feature point detection unit that detects feature points from an image and outputs coordinate values; a local feature descriptor extracting unit that extracts local feature descriptors from local regions centered on the coordinate values of the feature points; a coordinate value scanning unit that converts the coordinate values into index values according to a specific scanning method; a sorting unit that sorts the index values; a difference calculation unit that calculates a differential value between two adjacent index values of the sorted index values and outputs a sequence of differential values; a differential encoding unit that encodes the sequence of the differential values in a sequential permutation; and a local feature descriptor encoding unit that encodes the local feature descriptors of the corresponding feature points in the same permutation as that of the sorted index values.

6 Claims, 7 Drawing Sheets

(51) Int. Cl.
  *G06F 17/30* (2006.01)
  *G06T 9/00* (2006.01)
  *H04N 19/54* (2014.01)

(56) References Cited

U.S. PATENT DOCUMENTS

| | | | |
|---|---|---|---|
| 5,381,144 A * | 1/1995 | Wilson et al. | 341/63 |
| 6,104,754 A * | 8/2000 | Chujoh | H04N 19/52 341/59 |
| 6,321,232 B1 * | 11/2001 | Syeda-Mahmood | G06F 17/30259 |
| 6,519,052 B1 * | 2/2003 | Oneda | G06T 9/00 358/1.12 |
| 6,577,760 B1 * | 6/2003 | Ohta et al. | 382/167 |
| 6,621,941 B1 * | 9/2003 | Syeda-Mahmood | G06F 17/30259 382/181 |
| 6,704,494 B1 * | 3/2004 | Chujoh | H04N 19/159 375/E7.212 |
| 6,711,293 B1 | 3/2004 | Lowe | |
| 6,754,268 B1 * | 6/2004 | Yamaguchi | G06T 3/40 375/240.08 |
| 2011/0286515 A1 * | 11/2011 | Huang | H04N 7/50 375/240.03 |
| 2012/0027084 A1 * | 2/2012 | Zhang | H04N 19/196 375/240.12 |
| 2012/0177298 A1 * | 7/2012 | Fujino | H04N 1/41 382/232 |

FOREIGN PATENT DOCUMENTS

| | | |
|---|---|---|
| JP | 2001-231037 A | 8/2011 |
| WO | WO-2010-101186 A1 | 9/2010 |

OTHER PUBLICATIONS

Herbert Bay et al., Speeded Up Robust Features (SURF), Science Direct, Computer Vision and Image Understanding 110 (2008), Elsevier, pp. 346-359.

David G. Lowe, Distinctive Image Features from Scale-invariant Keypoints, (U.S.), International Journal of Computer Vision, 60(2), 2004, p. 91-110.

* cited by examiner

FEATURE DESCRIPTOR ENCODING APPARATUS, FEATURE DESCRIPTOR ENCODING METHOD, AND PROGRAM

CROSS-REFERENCE TO RELATED APPLICATIONS

This application is a national stage application of International Application No. PCT/JP2012/079676 entitled "Feature Descriptor Encoding Apparatus, Feature Descriptor Encoding Method, and Program," filed on Nov. 15, 2012, which claims the benefit of the priority of Japanese Patent Application No. 2011-253225, filed on Nov. 18, 2011, the disclosures of each of which are hereby incorporated by reference in their entirety.

BACKGROUND

The present invention relates to a feature descriptor encoding apparatus, a feature descriptor encoding method, and a program.

Systems have been suggested for detecting a large number of interest points (feature points) located in an image and extracting feature descriptors (local feature descriptors) in a local region around each feature point, so that an object in the image could be identified in a manner robust to occlusion and changes of image capturing size and angle. Patent Document 1 and Non-Patent Document 1 disclose local feature descriptor extracting apparatuses using a SIFT (Scale Invariant Feature Transform) feature descriptor as typical such systems. Non-Patent Document 2 discloses a local feature descriptor extracting apparatus using a SURF (Speeded Up Robust Features) feature descriptor as another such system.

In those local feature descriptor extracting apparatuses, the coordinate values of feature points and the extracted local feature descriptors are outputted with respect to each of a plurality of feature points detected from an image. Thus, a set of coordinate values and local feature descriptors is taken as a feature descriptor representing the entire image. Both the coordinate values and the local feature descriptors of a plurality of feature points are used to match the images.

Figure 7:
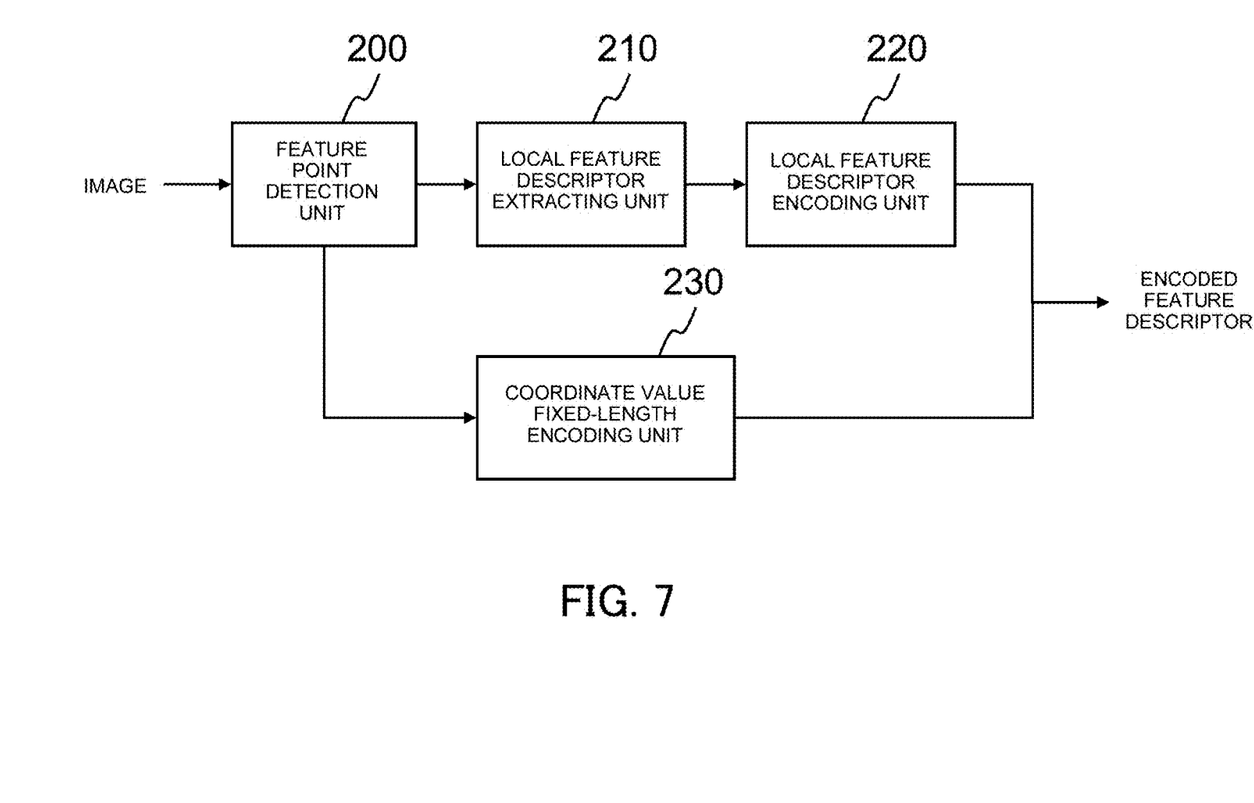
FIG. 7 shows an example of the typical configuration of a feature descriptor encoding apparatus.

Encoding is typically performed when saving and transmitting those local feature descriptors. FIG. 7 shows an example of a typical configuration of a feature descriptor encoding apparatus that encodes local feature descriptors. As shown in FIG. 7, the feature descriptor encoding apparatus is provided with a feature point detection unit 200, a local feature descriptor extracting unit 210, a local feature descriptor encoding unit 220, and a coordinate value fixed-length encoding unit 230.

The feature point detection unit 200 detects a large number of interest points (feature points) from an image and outputs coordinate values of the feature points. Two coordinate values, namely, an X coordinate value and an Y coordinate value, are outputted. The local feature descriptor extracting unit 210 extracts feature descriptors from a local region centered on each coordinate value by using the coordinate values of the detected feature points and outputs the extracted feature descriptors as local feature descriptors. For example, when the above-mentioned SIFT feature descriptors are used, the local feature descriptor extracting unit 210 can divide a local region into 4×4=16 blocks, generate a gradient direction histogram quantized in 8 directions with respect to each block, and take a gradient direction histogram of 128 dimensions=16 blocks×8 gradient directions as local feature descriptors. The local feature descriptor encoding unit 220 encodes the extracted local feature descriptors. For example, when the above-mentioned SIFT feature descriptor is used, the local feature descriptor encoding unit 220 can encode the 128-dimensional feature descriptor corresponding to one feature point, for example, with a total of 128 bytes by encoding one dimension with 1 byte. The coordinate value fixed-length encoding unit 230 encodes the coordinate values of each feature point with a fixed bit length. The coordinate value includes an X coordinate value and an Y coordinate value. The coordinate value is typically extracted as a floating-point number and, therefore, represented, for example, as 4-byte or 8-byte information. For this reason, the coordinate value fixed-length encoding unit 230 encodes the X coordinate value and Y coordinate value corresponding to one feature point with 8 bytes (4 bytes×2) or 16 bytes (8 bytes×2). The encoded local feature descriptors outputted by the local feature descriptor encoding unit 220 and the encoded coordinate values outputted by the coordinate value fixed-length encoding unit 230 are together taken as encoded feature descriptors.

Patent Document 1: U.S. Pat. No. 6,711,293

Non-Patent Document 1: David G. Lowe, "Distinctive image features from scale-invariant keypoints" (USA), International Journal of Computer Vision, 60(2), 2004, p. 91-110

Non-Patent Document 2: Herbert Bay, Andreas Ess, Tinne Tuytelaars, Luc Van Gool "SURF: Speeded Up Robust Features" (USA), Computer Vision and Image Understanding (CVIU), Vol. 110, No. 3, 2008, p. 346-359

SUMMARY

The problem associated with the above-described feature descriptor encoding apparatus is that the size thereof is increased because the coordinate values are encoded with a fixed bit length. As mentioned hereinabove, the coordinate values relating to one feature point are encoded with 8 bytes or 16 bytes. In the case of the SIFT feature descriptors, the number of feature points that are typically detected from an image is from several hundreds to several thousands and, therefore, the coordinate values of feature points correspond to a data amount from several kilobytes to several tens of kilobytes. Where the size of encoded feature descriptors becomes that large, problems can be encountered when using the encoded feature descriptors for image matching. For example, when the user terminal (for example, a portable terminal equipped with a camera) extracts feature descriptors from an image, encodes the extracted feature descriptors, and transmits the encoded feature descriptors to a server to retrieve an image similar to the above-mentioned image, the communication time increases when the size of the encoded feature descriptors is large. Therefore, the time till the image retrieval result is obtained also increases. Further, in the case of image retrieval using the encoded feature descriptors, the encoded feature descriptors of the image are stored in a memory, but where the size of encoded feature descriptors is large, the number of images for which the encoded feature descriptors can be stored in the memory decreases. Therefore, the above-described approach is not suitable for large-scale retrieval of large-volume images as objects.

Accordingly, it is an object of the present invention to reduce the size of encoded feature descriptors.

According to an aspect of the present invention, a feature descriptor encoding apparatus includes a feature point detection unit that detects feature points from an image and outputs coordinate values; a local feature descriptor extracting unit that extracts local feature descriptors from local regions centered on the coordinate values of the feature points; a coordinate value scanning unit that converts the coordinate values into index values according to a specific scanning method; a sorting unit that sorts the index values; a difference calculation unit that calculates a differential value between two adjacent index values of the sorted index values and outputs a sequence of differential values; a differential encoding unit that encodes the sequence of the differential values in a sequential permutation; and a local feature descriptor encoding unit that encodes the local feature descriptors of the corresponding feature points in the same permutation as that of the sorted index values.

Another aspect of the present invention resides in a feature descriptor encoding method for causing a computer to: detect feature points from an image and output coordinate values; extract local feature descriptors from local regions centered on the coordinate values of the feature points; convert the coordinate values into index values according to a specific scanning method; sort the index values; calculate a differential value between two adjacent index values of the sorted index values and output a sequence of differential values; encode the sequence of the differential values in a sequential permutation; and encode the local feature descriptors of the corresponding feature points in the same permutation as that of the sorted index values.

Another aspect of the present invention resides in a program for causing a computer to realize: a function of detecting feature points from an image and outputting coordinate values; a function of extracting local feature descriptors from local regions centered on the coordinate values of the feature points; a function of converting the coordinate values into index values according to a specific scanning method; a function of sorting the index values; a function of calculating a differential value between two adjacent index values of the sorted index values and outputting a sequence of differential values; a function of encoding the sequence of the differential values in a sequential permutation; and a function of encoding the local feature descriptors of the corresponding feature points in the same permutation as that of the sorted index values.

In the present invention, the term "unit" does not simply stands for physical means, but also includes the realization of the functions of the "unit" with software. The functions of one "unit" or apparatus may be realized by two or more physical means or apparatuses, and the functions of two or more "units" or apparatuses may be realized on one physical means or apparatus.

In accordance with the present invention, the size of the encoded feature descriptors can be reduced.

DETAILED DESCRIPTION

Embodiments of the present invention will be described below with reference to the appended drawings.

First Embodiment

Figure 1:
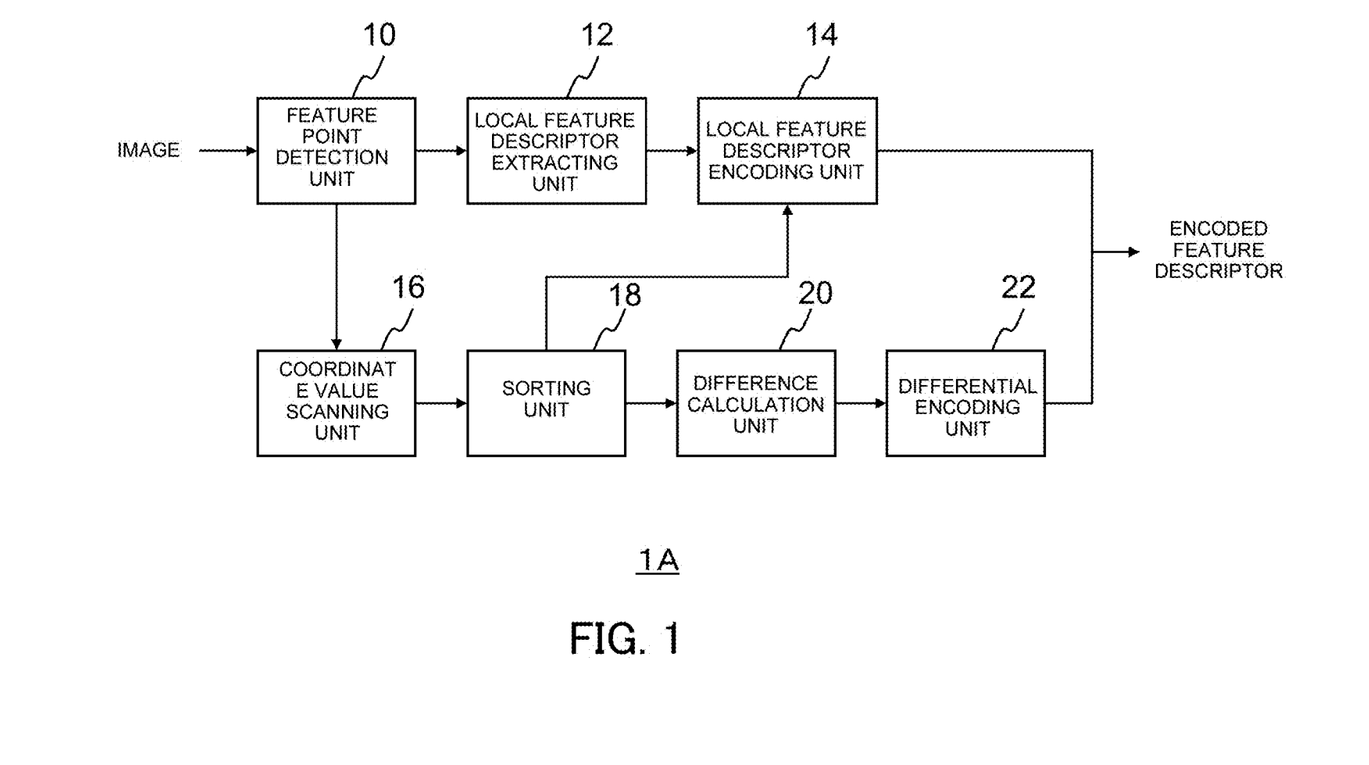
FIG. 1 shows the configuration of the feature descriptor encoding apparatus according to the first embodiment of the present invention.

FIG. 1 shows the configuration of the feature descriptor encoding apparatus which is the first embodiment of the present invention. The feature descriptor encoding apparatus 1A is configured of a feature point detection unit 10, a local feature descriptor extracting unit 12, a local feature descriptor encoding unit 14, a coordinate value scanning unit 16, a sorting unit 18, a difference calculation unit 20, and a differential encoding unit 22. The feature descriptor encoding apparatus 1A can be configured, for example, by using an information processing apparatus such as a personal computer or a portable information terminal. The components constituting the feature descriptor encoding apparatus 1A can be realized, for example, by using a storage area such as a memory, or by executing a program stored in a storage area with a processor. The constituent elements in other embodiments described hereinbelow can be realized in a similar manner.

The feature point detection unit 10 detects a large number of interest points (feature points) from an image and outputs coordinate values of the feature points. Two coordinate values, namely, an X coordinate value and an Y coordinate value, are outputted (two-dimensional information). The outputted coordinate values can have any representation accuracy. Thus, the outputted coordinate values may have a pixel accuracy, a sub-pixel accuracy (accuracy finer than the pixel accuracy), or an accuracy coarser than the pixel accuracy.

The local feature descriptor extracting unit 12 uses the coordinate values of each detected feature point, extracts the feature descriptors from the local regions centered on the coordinate values, and outputs the extracted feature descriptors as local feature descriptors. For example, the local feature descriptor extracting unit 12 can output the local feature descriptors by using the above-mentioned SIFT feature descriptors. More specifically, the local feature descriptor extracting unit 12 may divide the local region into 4×4=16 blocks, generate a gradient direction histogram quantized in 8 directions with respect to each block, and take a gradient direction histogram of 128 dimensions=16 blocks×8 gradient directions as local feature descriptors. The feature descriptors to be extracted are not limited to the SIFT feature descriptors and may be any feature descriptors.

The coordinate value scanning unit 16 scans the image according to a certain specific scanning method and converts the two-dimensional coordinate values (X coordinate value and Y coordinate value) of the feature points into one-dimensional index values. The index value is a scanning distance from the point of origin for the scanning.

Figure 2:
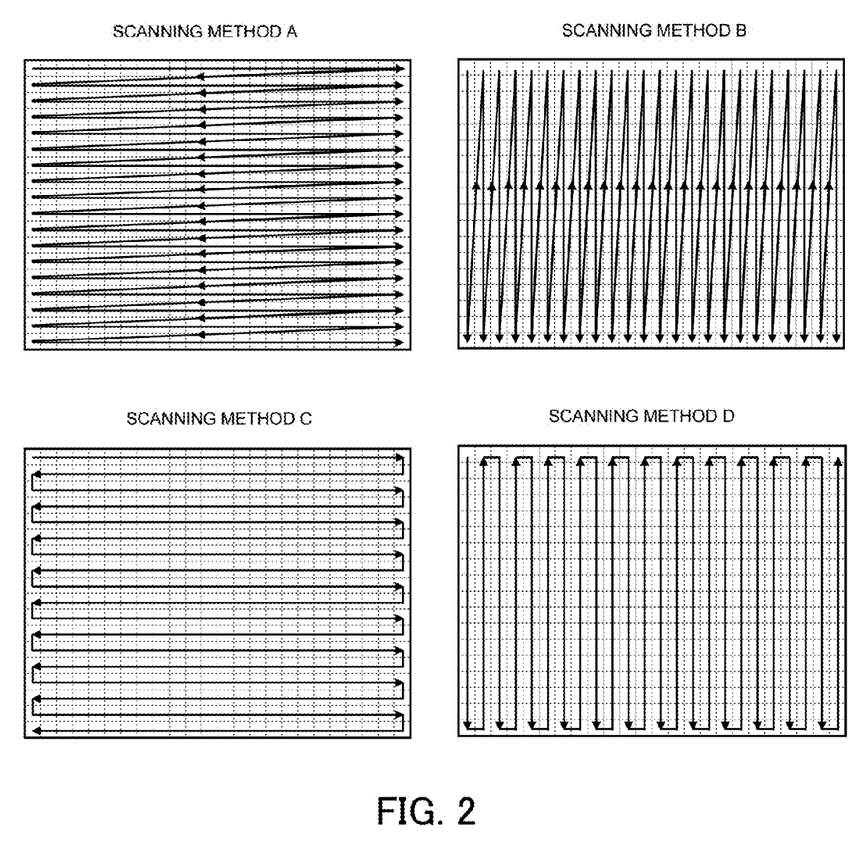
FIG. 2 shows an example of a method for scanning coordinate values.

An example of the scanning method is shown in FIG. 2. With this scanning method, raster scanning may be performed by scanning in the transverse direction from the left to the right by one row, with the upper left corner of the image serving as a point of origin, for example, as in the scanning method A in FIG. 2. The raster scanning may be also performed in the vertical direction, as in the scanning method B in FIG. 2. Alternatively, the scanning direction may be reversed after each row, as in the scanning method C or scanning method D in FIG. 2. The examples shown in FIG. 2 are not limiting.

An example of a method for converting the two-dimensional coordinate values into one-dimensional index values is explained below. For example, the two-dimensional coordinate values have a pixel accuracy, and the X coordinate values are represented as x (x=0 to (width−1)) and the Y coordinate values are represented as y (y=0 to (height−1)), where the number of pixels in the transverse direction of the image is taken as the "width" and the number of pixels in the vertical direction is taken as the "height", and the upper left corner is taken as a point of origin. In this case, with the scanning method A shown in FIG. 2, the coordinate value scanning unit 16 can convert two-dimensional coordinate values (x, y) into one-dimensional index values (0 to width×height−1) with the following Eq. (1).

$$y \times width + x \tag{1}$$

In this example, the coordinate value scanning unit 16 converts the two-dimensional coordinate values of pixel accuracy into one-dimensional index values with the same representation accuracy. When performing the conversion to index values, the coordinate value scanning unit 16 may convert the representation accuracy. For example, when performing the conversion to index values, the coordinate value scanning unit 16 may convert the representation accuracy to a two-pixel accuracy (2×2 pixels are degenerated to 1 pixel) or four-pixel accuracy (4×4 pixels are degenerated to 1 pixel). When the two-dimensional coordinate values are represented by floating-point numbers, the coordinate value scanning unit 16 may convert the representation accuracy of two-dimensional coordinate values into any representation accuracy (fixed-point data) and then convert into one-dimensional index values. For example, the coordinate value scanning unit 16 may convert the representation accuracy of two-dimensional coordinate values into pixel accuracy and then convert into one-dimensional index values.

The sorting unit 18 sorts the index values of feature points and outputs information on the post-sorting permutation. The sorting unit 18 may perform sorting, for example, in the ascending order, but sorting in the descending order may be also performed.

The difference calculation unit 20 calculates differential values between two adjacent index values in the sorted index values and outputs the sequence of the differential values. When the sequence of the sorted index values is $V_i$ (i=0, 1, 2, ...), the difference calculation unit 20 can calculate the sequence $D_i$ (i=0, 1, 2, ...) of differential values by the following Eq. (2). Here, $D_0 = V_0$.

$$D_i = V_i - V_{i-1} \tag{2}$$

The differential encoding unit 22 encodes the sequence of the differential values in a sequential permutation. The encoding of the sequence of the differential values may be performed, for example, by fixed-bit-length encoding. When fixed-bit-length encoding is performed, the bit length may be set in advance, but in this case, the encoding size is not reduced because the number of bits necessary for representing the maximum value of assumable differential values is required. Accordingly, the differential encoding unit 22 can determine the bit length on the basis of the sequence of the inputted differential values when the fixed-bit-length encoding is performed. More specifically, for example, the differential encoding unit 22 can determine the maximum differential value from the sequence of the inputted differential values, determine the number of bits (representation bit number) necessary for representing the maximum value, and encode the sequence of the differential values by the determined representation bit number.

For example, where the maximum value in the sequence of the differential values is taken as $D_{MAX}$, the differential encoding unit 22 can compute the representation bit number N for encoding the sequence of the differential values by the following Eq. (3). The minimum differential value is taken as 0.

[Formula 1]

$$N = \text{ceil}(\log_2(D_{MAX}+1)) \tag{3}$$

In this case, the differential encoding unit 22 also encodes the information on the value of the representation bit number, that is, N, to enable the decoding of the sequence of the encoded differential values. More specifically, for example, the differential encoding unit 22 can add information on the value of the encoded representation bit number to the head of the sequence of the encoded differential values. The number of bits necessary for representation is usually less for the differential values of the sorted index values than for two-dimensional coordinate values. Therefore, the coordinate values can be represented with a smaller encoding size.

The differential encoding unit 22 may also encode the sequence of the differential values by a uniquely decodable variable-length code. For example, the differential encoding unit 22 may use the Huffman code or arithmetic code. The differential encoding unit 22 may also use the Golomb code or Golomb-Rice code.

The differential encoding unit 22 may also encode information on the number of elements (that is, the number of feature points) in the sequence of the differential values, or information on the encoding size of the sequence of the encoded differential values. As a result, the end of the sequence of the differential values can be determined when the encoded sequence of the differential values is decoded.

In addition to the encoding the sequence of the differential values, the differential encoding unit 22 may also encode other types of information necessary for restoring the original two-dimensional coordinate values. For example, the differential encoding unit 22 may also encode information such as one-row scanning width (transverse width in the scanning method A and scanning method C, and the vertical width in the scanning method B and scanning method D in FIG. 2) in the coordinate value scanning unit 16. Further, for example, where the representation accuracy is converted in the coordinate value scanning unit 16, the differential encoding unit 22 may encode information specifying the representation accuracy, or information such as the conversion coefficient for restoring to the value area of the original two-dimensional coordinate system. For example, where a scanning method to be used in the coordinate value scanning unit 16 is not limited in advance to one particular method, but can be selected from among a plurality of scanning methods, the differential encoding unit 22 may also encode information specifying the scanning method that has been used in the coordinate value scanning unit 16.

The local feature descriptor encoding unit 14 encodes the local feature descriptors of the corresponding feature points in a permutation same as that of the sorted index values of the feature points. By encoding in the same permutation as that of the sorted index values, it is possible to associate the coordinate values encoded in the differential encoding unit 22 with the local feature descriptors corresponding thereto at a one-to-one basis. The local feature descriptor encoding unit 14 can encode 128-dimensional feature descriptors relating to one feature point, for example, with a total of 128 bytes by encoding one dimension with one byte, for example, by using the above-mentioned SIFT feature descriptors.

A combination of the encoded local feature descriptors outputted by the local feature descriptor encoding unit 14 and the encoded coordinate values outputted by the differential encoding unit 22 is taken as the encoded feature descriptors.

Figure 3:
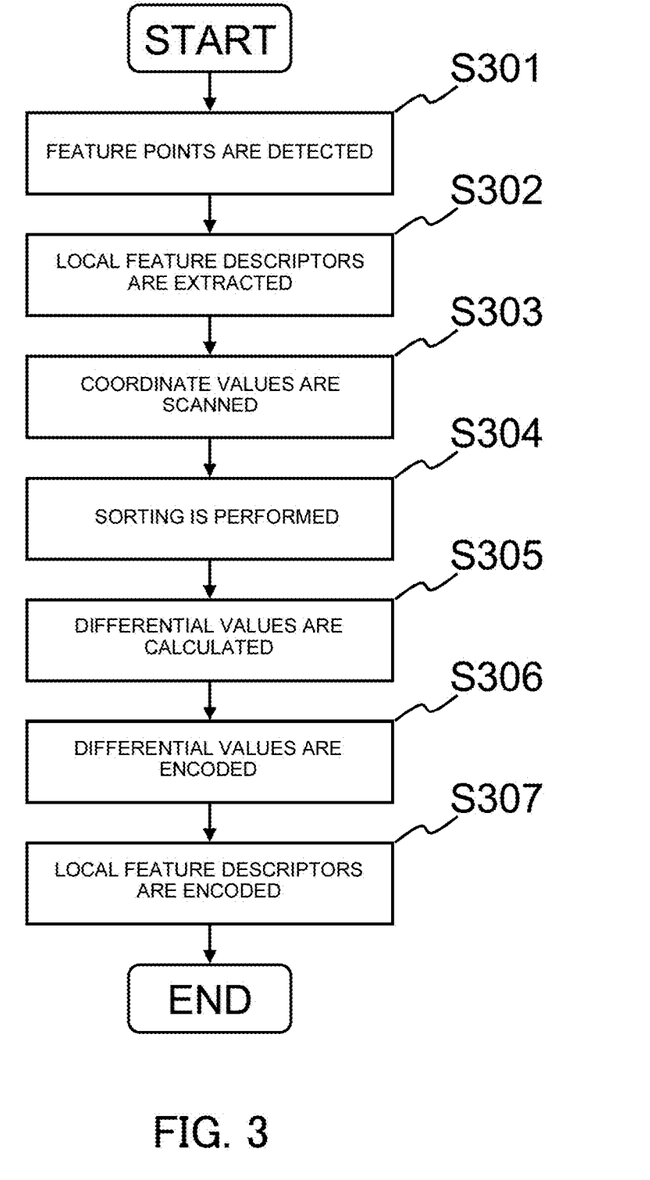
FIG. 3 is a flowchart showing an example of processing performed in the feature descriptor encoding apparatus.

FIG. 3 is a flowchart showing an example of the processing performed in the feature descriptor encoding apparatus 1A. Initially, the feature point detection unit 10 detects feature points from an image and outputs coordinate values (S301). Where feature points are detected, the local feature descriptor extracting unit 12 extracts local feature descriptors from local regions centered on the coordinate values of the detected feature points (S302). The coordinate value scanning unit 16 then converts the detected coordinate values into index values according to a specific scanning method (S303). Then, the sorting unit 18 sorts the index values (S304). The difference calculation unit 20 calculates the differential values of two adjacent index values among the sorted values and outputs the sequence of the differential values (S305). The differential encoding unit 22 encodes the sequence of the differential values in a sequential permutation (S306). Finally, the local feature descriptor encoding unit 14 encodes the local feature descriptors of the corresponding feature points in the same permutation as that of the sorted index values (S307). The example described herein is an example of processing performed in the feature descriptor encoding apparatus 1A and the order thereof is not limiting. For example, the extraction of the local feature descriptors (S302) may be executed at any point of time, provided it is after the detection of the feature descriptors (S301). Further, the encoding of the local feature descriptors (S307) may be executed at any point of time, provided it is after the sorting of the index values (S304).

A method for decoding the encoded feature descriptors that have been encoded in the feature descriptor encoding apparatus 1A is explained below. As for the encoded coordinate values, first, the differential values are decoded and the sequence $D_i$ (i=0, 1, 2, . . . ) of the differential values is restored. Then, the sequence $V_i$ (i=0, 1, 2, . . . ) of the index values is restored by adding the differential values from the head of the sequence of the differential values. More specifically, the restoration is performed by the following Eq. (4) under an assumption that $V_0 = D_0$.

$$V_i = V_{i-2} + D_i \quad (4)$$

Then, one-dimensional index values are converted into two-dimensional coordinate values and the coordinate values are restored. The sequence of the local feature descriptors obtained by decoding the encoded local feature descriptors has the same permutation as the sequence of the restored coordinate values. Therefore, the decoded local feature descriptors are associated in a one-to-one manner with the decoded coordinate values. The local feature descriptors and the corresponding coordinate values can thus be decoded. With such a method, it is possible to configure a feature descriptor decoding apparatus that decodes the encoded feature descriptors that has been encoded by the feature descriptor encoding apparatus 1A.

The effect of the first embodiment is described below. With the feature descriptor encoding apparatus 1A of the first embodiment, the differential encoding unit 22 encodes the differential values of the sorted index values. Since the differential values of the sorted index values are usually small, the number of bits necessary for the representation is usually less than that for the original two-dimensional coordinate values. As a result, the coordinate values can be represented with a smaller encoding amount. Therefore, the size of the encoded feature descriptors can be reduced.

Second Embodiment

Figure 4:
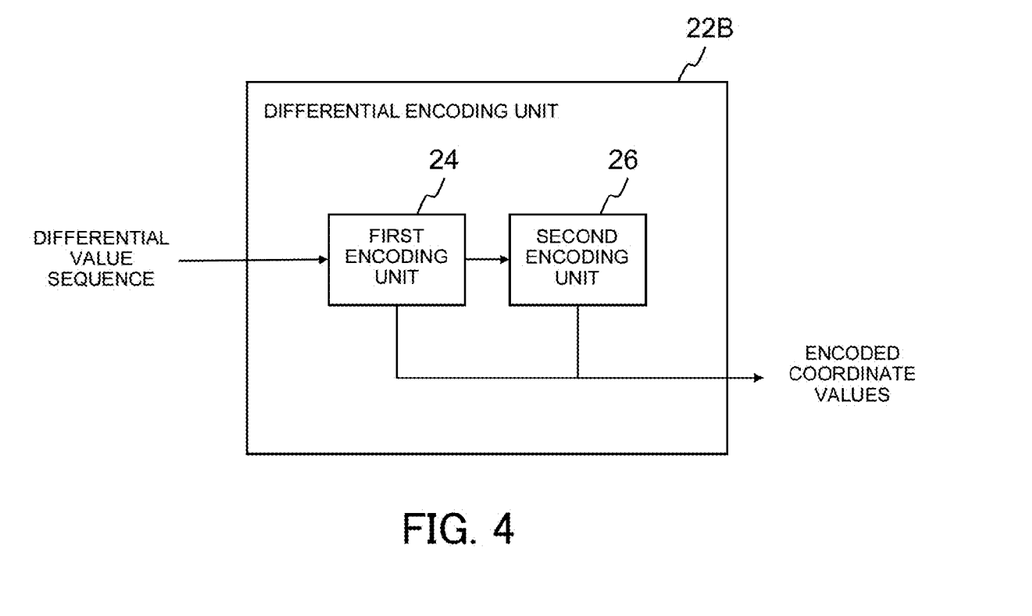
FIG. 4 shows the configuration of the differential encoding unit of the feature descriptor encoding apparatus of the second embodiment of the present invention.

The second embodiment is described below. FIG. 4 shows the configuration of the differential encoding unit 22 of the feature descriptor encoding apparatus according to the second embodiment of the present invention. In the feature descriptor encoding apparatus of the second embodiment, the differential encoding unit 22 of the feature descriptor encoding apparatus 1A of the first embodiment is changed to a differential encoding unit 22B shown in FIG. 4. Other configurations of the feature descriptor encoding apparatus of the second embodiment are the same as those of the feature descriptor encoding apparatus 1A of the first embodiment shown in FIG. 1, and therefore the explanation thereof is herein omitted.

As shown in FIG. 4, the differential encoding unit 22B includes a first encoding unit 24 and a second encoding unit 26. In the differential encoding unit 22B, the sequence of the differential values is encoded by encoding with a two-stage configuration including the first encoding unit 24 and the second encoding unit 26. The first encoding unit 24 and the second encoding unit 26 perform the encoding by different encoding methods. The different encoding methods may differ, for example, in an encoding system (the encoding system, as referred to herein, relates to an algorithm system such as a fixed-length code, a Huffman code, and a Golomb code), or may have the same encoding system and differ in parameters (for example, encoding by different bit lengths can be used in fixed-length code).

Where the differential values are within the encodable value area, the first encoding unit 24 encodes the differential values, and where the differential values are outside the encodable value area, an escape code indicating such deviation is encoded. One among the codes suitable for encoding by the first encoding unit 24 is allocated to the escape code. For example, a maximum value that can be encoded by the first encoding unit 24 can be allocated to the escape code. The "encodable value area", as referred to herein, is assumed to exclude the escape code.

Where the first encoding unit 24 has encoded the escape code, the second encoding unit 26 encodes the differential values by an encoding method different from that of the first encoding unit 24. The differential values encoded at this time do not include the value area encodable in the first encoding unit 24. Therefore, the second encoding unit 26 may perform encoding with a minimum bit length necessary for encoding the differential values, upon excluding the value area encodable in the first encoding unit 24.

The operation of the first encoding unit 24 and the second encoding unit 26 is explained below on the basis of a specific example. In this example, both the first encoding unit 24 and the second encoding unit 26 perform fixed-length encoding, the first encoding unit 24 performs the M-bit fixed-length encoding, and the second encoding unit 26 performs the N-bit fixed-length encoding. Here, M<N. Since the first encoding unit 24 performs the M-bit encoding, values from 0 to $2^M - 1$ can be encoded. Among those values, $2^M - 1$, which is the maximum value, is allocated to the escape code. As a result, the value area in which the first encoding unit 24 can encode the differential values is from 0 to $2^M - 2$.

Where the inputted differential value is within the value area from 0 to $2^M - 2$, the first encoding unit 24 performs the M-bit fixed-length encoding of the differential value and outputs the code. In this case, since the second encoding unit 26 performs no encoding, the first encoding unit 24 encodes the next differential value in the sequence of the differential values.

Where the inputted differential value is outside the value area from 0 to $2^M-2$ (that is, larger than $2^M-2$), the first encoding unit 24 performs the M-bit fixed-length encoding of $2^M-1$, which is the escape code, and outputs the code. Where the first encoding unit 24 has encoded the escape code, the second encoding unit 26 performs the N-bit fixed-bit-length encoding of the differential values. As for the value of N in this case, the minimum bit length enabling the encoding of the maximum value of assumable differential values may be stipulated in advance. Further, for example, the second encoding unit 26 may determine the maximum value of the differential values from the sequence of the inputted differential values and determine N by the minimum bit length enabling the encoding of the maximum value. For example, where the maximum value of the sequence of the differential values is taken as $D_{MAX}$, the second encoding unit 26 can calculate the minimum bit length N enabling the encoding thereof by the following Eq. (5). Here, the minimum value of the differential values is taken as 0.

[Formula 2]

$$N = \text{ceil}(\log_2(D_{MAX}+1)) \quad (5)$$

Here, ceil( ) is a function for rounding up at or below the decimal point. Further, since $2^M-1$ numerical values among 0 to $2^M-2$ values, which represent the value area in which the first encoding unit 24 can perform the encoding, can be excluded, the second encoding unit 26 may encode the differential values upon exclusion of those numerical values. In this case, the second encoding unit 26 can calculate the minimum bit length N for encoding the differential values by the following Eq. (6).

[Formula 3]

$$N = \text{ceil}(\log_2(D_{MAX}-2^M+2)) \quad (6)$$

Where N is thus determined from the maximum value of the sequence of the differential values, the second encoding unit 26 also encodes the information on the bit length N so as to enable the decoding of the sequence of the encoded differential values. For example, the second encoding unit 26 can add the information on the encoded bit length N to the head of the sequence of the encoded differential values.

For example, the bit length M of the fixed encoding performed by the first encoding unit 24 may be also stipulated in advance, or may be determined adaptively by the first encoding unit 24. Where the bit length M is determined adaptively, the first encoding unit 25 also encodes the information on the bit length M to enable the decoding of the sequence of the encoded differential values.

In the example explained herein, the first encoding unit 24 and the second encoding unit 26 perform the fixed-length encoding, but this encoding method is not limiting. For example, the encoding may be performed by using the Huffman code, arithmetic code, Golomb code, and Golomb-Rice code. For example, the first encoding unit 24 may perform the encoding by using the Golomb code, and the second encoding unit 26 may perform the fixed-length encoding. In this case, for example, the maximum bit length for the first encoding unit 24 to perform the encoding with the Golomb code is stipulated in advance. Further, with such a setting, the Golomb-encodable maximum value is allocated as the escape code, and the numerical values less than this value are taken as the encodable value area. Where the differential value is within this value area, the first encoding unit 24 preforms Golomb encoding of the differential value and outputs the code. Meanwhile, where the differential value is outside the value area, the first encoding unit 24 performs Golomb encoding of the escape code and outputs the code. In this case, the second encoding unit 26 performs fixed-length encoding of the differential value.

Figure 5:
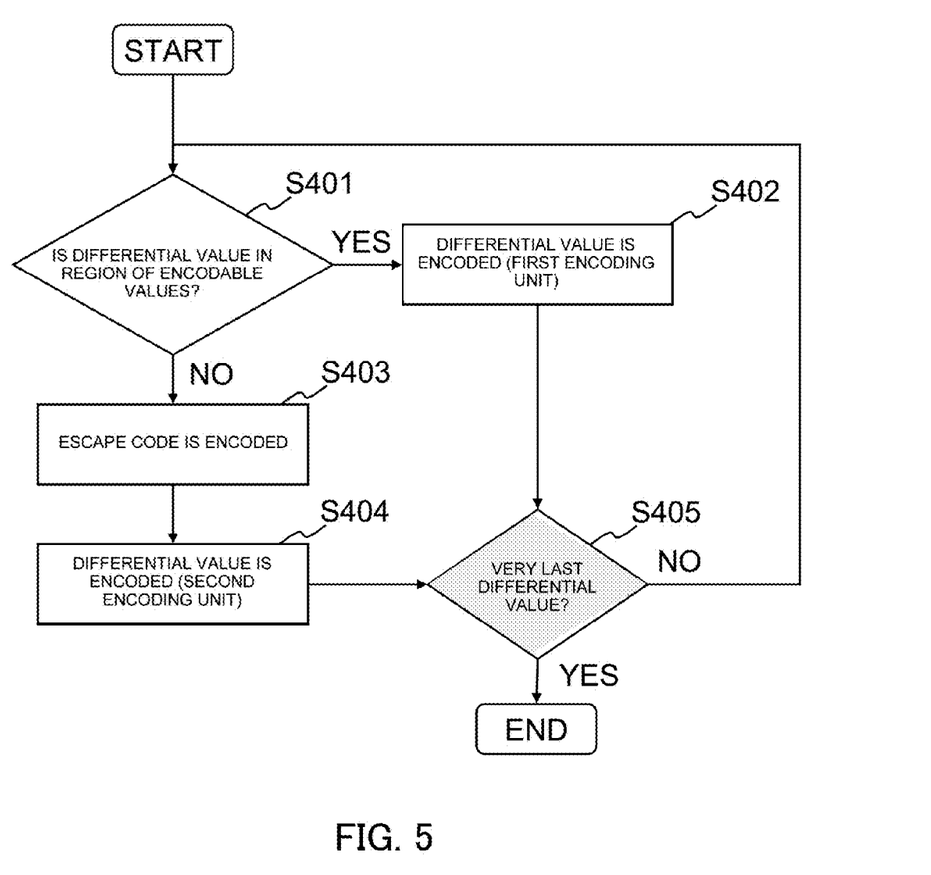
FIG. 5 is a flowchart showing an example of processing performed in the differential encoding unit in the feature descriptor encoding apparatus of the second embodiment.

FIG. 5 is a flowchart illustrating an example of processing performed by the differential encoding unit 22B in the feature descriptor encoding apparatus of the second embodiment. The differential encoding unit 22B successively processes the differential values in the sequence of the differential values. Initially, the first encoding unit 24 determines whether or not the differential value is in the encodable value area (S401). Where the differential value is within the encodable value area, the first encoding unit 24 encodes the differential value (S402). The processing then advances to step S405. Where the differential value is not in the encodable value area (outside the value area), the first encoding unit 24 encodes the escape code (S403). Then, the second encoding unit 26 encodes the differential value by the encoding method different from that of the first encoding unit 24 (S404). The processing then advances to step S405. In step 405, the first encoding unit 24 determines whether the processed differential value is the very last element of the sequence of the differential values (S405). Where the processed differential value is the very last element, the processing ends. Where the processed differential value is not the very last element, the processing again advances to step S401, and the processing is executed with respect to the next differential value of the sequence of the differential values.

A method for decoding the sequence of the differential values encoded by the differential encoding unit 22B in the feature descriptor encoding apparatus of the second embodiment is explained below. The differential values are successively restored from the head of the sequence of the differential values. First, the value of the very first element of the sequence of the encoded differential values is decoded. Since this value has been encoded by the first encoding unit 24, it is decoded according to the encoding parameter of the first encoding unit 24. For example, in the case of the above-mentioned M-bit fixed-bit-length encoding, the M-bit section is decoded. When the decoded value is not the escape code, this value is restored as the differential value, and the processing advances to the restoration of the next differential value (decoding of the value encoded by the first encoding unit 24 is performed again). When the decoded value is the escape code, the value of the next element is decoded. Since this value has been encoded by the second encoding unit 26, it is decoded according to the encoding parameter of the second encoding unit 26. For example, in the case of the above-described N-bit fixed-bit-length encoding, the N-bit section is decoded. This value is then restored as the differential value and the processing advances to the restoration of the next differential value (decoding of the value encoded by the first encoding unit 24 is performed again). The sequence of the differential values can thus be decoded. With such a method, it is possible to configure a feature descriptor decoding apparatus provided with a differential decoding unit that decodes the sequence of encoded feature descriptors.

The effect of the second embodiment is described below. With the feature descriptor encoding apparatus of the second embodiment, the differential encoding unit 22B performs the encoding of a two-stage configuration with the first encoding unit 24 and the second encoding unit 26. The differential values of sorted index values are usually small values, but large values are also included (that is, the appearance frequency of small values is high and the appearance frequency of large values is low). As a result of using such a two-stage configuration, the first encoding unit 24 can encode the small values, which have a high appearance frequency, with a small code length, and the second encoding unit 26 can encode the large values, which have a low appearance frequency. Therefore, an average code length can be decreased by comparison with that during the encoding of a one-stage configuration. Therefore, the size of the encoded feature descriptors can be reduced.

Third Embodiment

Figure 6:
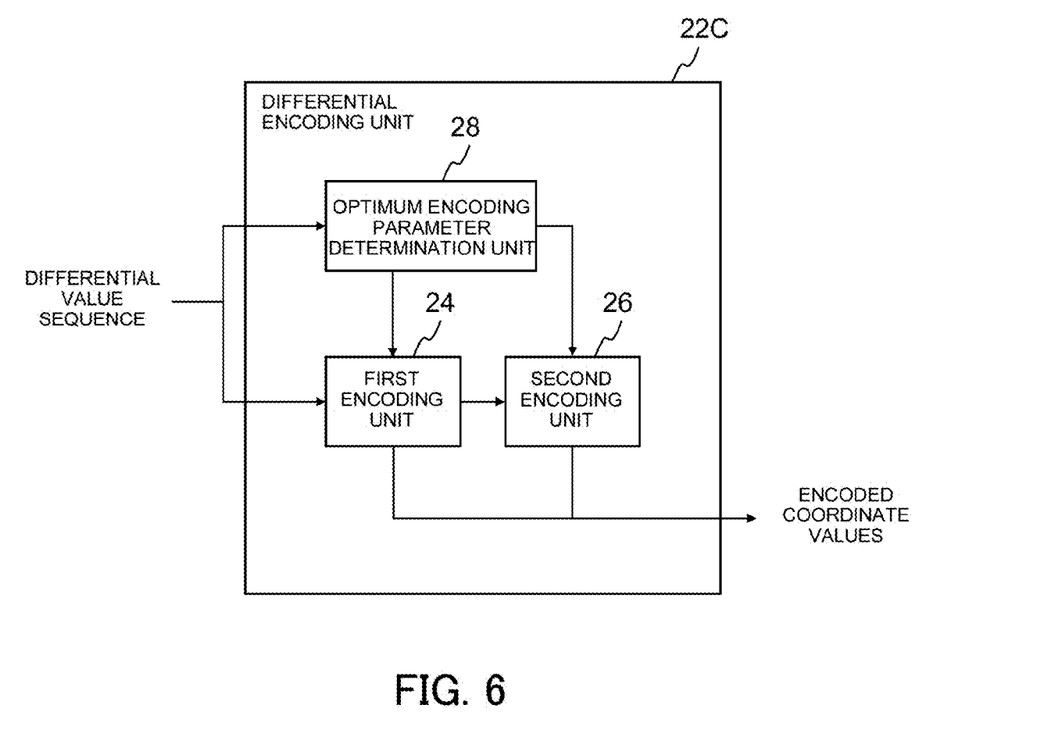
FIG. 6 shows the configuration of the differential encoding unit of the feature descriptor encoding apparatus of the third embodiment of the present invention.

The third embodiment is explained below. FIG. 6 shows the configuration of a differential encoding unit 22C of the feature descriptor encoding apparatus of the third embodiment of the present invention. In the feature descriptor encoding apparatus of the third embodiment, the differential encoding unit 22 of the feature descriptor encoding apparatus 1A of the first embodiment is changed to the differential encoding unit 22C shown in FIG. 6. Other configurations are the same as in the feature descriptor encoding apparatus 1A of the first embodiment shown in FIG. 1, and the explanation thereof is herein omitted.

As shown in FIG. 6, the differential encoding unit 22C includes the first encoding unit 24, the second encoding unit 26, and an optimum encoding parameter determination unit 28. Thus, the differential encoding unit 22C is configured by adding the optimum encoding parameter determination unit 28 to the differential encoding unit 22B of the second embodiment shown in FIG. 4. Since the first encoding unit 24 and the second encoding unit 26 have the same configuration as the units included in the differential encoding unit 22B of the second embodiment, they are assigned with same reference numerals and the explanation thereof is herein omitted.

The optimum encoding parameter determination unit 28 determines the parameters of the encoding performed by the first encoding unit 24 and the second encoding unit 26 from the sequence of the differential values, such that the code length of the sequence of the encoded differential values becomes the shortest.

The first encoding unit 24 and the second encoding unit 26 use the determined encoding parameters to perform the encoding in the same manner as in the second embodiment.

A specific example of the operation of the optimum encoding parameter determination unit 28 is explained below. Here, the operation of the optimum encoding parameter determination unit 28 is explained with respect to the case in which the first encoding unit 24 performs the M-bit fixed-bit-length encoding and the second encoding unit 26 performs the N-bit fixed-bit-length encoding (here, M<N) as described in the second embodiment.

In this case, the optimum encoding parameter determination unit 28 determines M and N such that the code length of the sequence of the encoded differential values is the shortest. The optimum encoding parameter determination unit 28 also encodes the information on the determined M and N together with the sequence of the differential values, such as to enable the decoding of the sequence of the encoded differential values. For example, the optimum encoding parameter determination unit 28 can add the encoded information on M and N to the head of the sequence of the encoded differential values.

For example, the optimum encoding parameter determination unit 28 can calculate the code length of the entire sequence of the encoded differential values while M and N are changed, and can determine M and N such that the code length is the shortest. More specifically, for example, as described in the second embodiment, the optimum encoding parameter determination unit 28 can determine the optimum N from the maximum value of the sequence of the encoded differential values by using Eq. (5). Where M is determined, the optimum encoding parameter determination unit 28 can determine N at which a shorter bit length is obtained by using Eq. (6).

The optimum encoding parameter determination unit 28 may calculate the code length of the entire sequence of the encoded differential values realized when M is changed, and determine M such that this code length is the shortest.

The optimum encoding parameter determination unit 28 can also calculate efficiently the code length of the sequence of the encoded differential values by adding up the numbers of the differential values within the value area encodable by the first encoding unit 24 (or the number of the differential values outside the value area (the number that will be encoded by the second encoding unit 26)). Thus, where the number of the differential values in the value area is denoted by A and the number of the differential values in the sequence of the differential values is denoted by Z, the entire code length becomes M×A+(M+N)×(Z−A). The optimum encoding parameter determination unit 28 can calculate M at which the entire code length is the shortest from this formula.

The effect of the third embodiment is described below. In the feature descriptor encoding apparatus of the third embodiment, the optimum encoding parameter determination unit 28 of the differential encoding unit 22 determines the encoding parameters such that the code length of the sequence of the encoded differential values becomes the shortest. Therefore, the encoding can be performed with the shortest code length. As a result, the size of the encoded feature descriptors can be reduced.

The embodiments described herein serve to facilitate the understanding of the present invention and should not be interpreted as limiting the present invention. The present invention can be changed/modified without departing from the essence thereof, and the present invention includes the equivalents thereof.

This application claims priority to Japanese Patent Application No. 2011-253225 filed on Nov. 18, 2011, and the entire disclose thereof is incorporated herein.

The invention of the present application is explained hereinabove with respect to the embodiments thereof, but the invention of the present application is not limited to the above-described embodiments. The configuration and specific details of the invention of the present application can be variously changed within the scope of the invention of the present application in a manner comprehensible by a person skilled in the art.

All or parts of the embodiments described herein can be also described as in the following appendixes, but are not limited thereto.

(Appendix 1) A feature descriptor encoding apparatus including a feature point detection unit that detects feature points from an image and outputs coordinate values; a local feature descriptor extracting unit that extracts local feature descriptors from local regions centered on the coordinate values of the feature points; a coordinate value scanning unit that converts the coordinate values into index values according to a specific scanning method; a sorting unit that sorts the index values; a difference calculation unit that calculates a differential value between two adjacent index values of the sorted index values and outputs a sequence of differential values; a differential encoding unit that encodes the sequence of the differential values in a sequential permutation; and a local feature descriptor encoding unit that encodes the local feature descriptors of the corresponding feature points in the same permutation as that of the sorted index values.

(Appendix 2) The feature descriptor encoding apparatus according to Appendix 1, wherein the differential encoding unit includes: a first encoding unit that, where the differential value is in an encodable value area, encodes the differential value, and where the differential value is outside the encodable value area, encodes an escape code indicating that the differential value is outside the encodable value area; and a second encoding unit that encodes the differential values by an encoding method different from that of the first encoding unit when the first encoding unit has encoded the escape code.

(Appendix 3) The feature descriptor encoding apparatus according to Appendix 2, wherein the differential encoding unit further includes an optimum encoding parameter determination unit that determines, from the sequence of the differential values, parameters of encoding performed by the first encoding unit and the second encoding unit, such that a code length of the sequence of the encoded differential values is the shortest.

(Appendix 4) The feature descriptor encoding apparatus according to Appendix 2 or 3, wherein the first encoding unit performs M-bit fixed-bit-length encoding; and the second encoding unit performs N-bit fixed-bit-length encoding, where N is greater than M.

(Appendix 5) A feature descriptor encoding method for causing a computer to: detect feature points from an image and output coordinate values; extract local feature descriptors from local regions centered on the coordinate values of the feature points; convert the coordinate values into index values according to a specific scanning method; sort the index values; calculate a differential value between two adjacent index values of the sorted index values and output a sequence of differential values; encode the sequence of the differential values in a sequential permutation; and encode the local feature descriptors of the corresponding feature points in the same permutation as that of the sorted index values.

(Appendix 6) A program for causing a computer to realize: a function of detecting feature points from an image and outputting coordinate values; a function of extracting local feature descriptors from local regions centered on the coordinate values of the feature points; a function of converting the coordinate values into index values according to a specific scanning method; a function of sorting the index values; a function of calculating a differential value between two adjacent index values of the sorted index values and outputting a sequence of differential values; a function of encoding the sequence of the differential values in a sequential permutation; and a function of encoding the local feature descriptors of the corresponding feature points in the same permutation as that of the sorted index values.

1A feature descriptor encoding unit
10 feature point detection unit
12 local feature descriptor extracting unit
14 local feature descriptor encoding unit
16 coordinate value scanning unit
18 sorting unit
20 difference calculation unit
22 differential encoding unit
24 first encoding unit
26 second encoding unit
28 optimum encoding parameter determination unit

We claim:

1. A feature descriptor encoding apparatus comprising:
a feature point detection unit configured to detect feature points from an image and outputs coordinate values;
a local feature descriptor extracting unit configured to extract local feature descriptors from local regions centered on the coordinate values of the feature points;
a coordinate value scanning unit configured to convert the coordinate values into index values according to a specific scanning method;
a sorting unit configured to sort the index values;
a difference calculation unit configured to calculate a differential value between two adjacent index values of the sorted index values and output a sequence of differential values;
a differential encoding unit configured to encode the sequence of the differential values in a sequential permutation; and
a local feature descriptor encoding unit configured to encode the local feature descriptors of the corresponding feature points in the same permutation as that of the sorted index values,
wherein the differential encoding unit includes:
a first encoding unit configured to perform M-bit fixed-length encoding by encoding the differential value when the differential value is in an encodable value area, and by encoding an escape code indicating that the differential value is outside the encodable value area when the differential value is outside the encodable value area;
a second encoding unit configured to perform N-bit fixed length encoding by encoding the differential values by an encoding method different from that of the first encoding unit when the first encoding unit has encoded the escape code, N being larger than M; and
an optimum encoding parameter determination unit configured to determine M and N from the sequence of the differential values such that a code length of the sequence of the encoded differential values is the shortest.

2. The feature descriptor encoding apparatus according to claim 1, wherein
the optimum encoding parameter determination unit is configured to calculate the code length while M and N are changed, and determine M and N such that the code length is the shortest.

3. The feature descriptor encoding apparatus according to claim 2, wherein
the optimum encoding parameter determination unit is configured to determine a minimum N based on an equation, $N=\text{ceil}(\log_2(D_{MAX}-2^M+2))$, where $D_{MAX}$ is a maximum value of the sequence of the differential values.

4. The feature descriptor encoding apparatus according to claim 3, wherein
the optimum encoding parameter determination unit is configured to determine M based on an equation, $L=M\times A+(M+N)\times(Z-A)$, such that the code length is the shortest, where L, A,
a function of detecting feature points from an image and outputting coordinate values;
a function of extracting local feature descriptors from local regions centered on the coordinate values of the feature points;
a function of converting the coordinate values into index values according to a specific scanning method;
a function of sorting the index values;
a function of calculating a differential value between two adjacent index values of the sorted index values and outputting a sequence of differential values;
a function of encoding the sequence of the differential values in a sequential permutation; and
a function of encoding the local feature descriptors of the corresponding feature points in the same permutation as that of the sorted index values, wherein said encoding of the sequence of the differential values includes:

performing M-bit fixed-length encoding by encoding the differential value when the differential value is in an encodable value area, and by encoding an escape code indicating that the differential value is outside the encodable value area when the differential value is outside the encodable value area;

performing N-bit fixed length encoding by encoding the differential values by an encoding method different from that of the first encoding unit when the first encoding unit has encoded the escape code, N being larger than M; and determining M and N from the sequence of the differential values such that a code length of the sequence of the encoded differential values is the shortest. and Z are the code length, a number of the differential values in the value area, and a number of the differential values in the sequence of the differential values, respectively.

5. A feature descriptor encoding method for causing a computer to execute:

detecting feature points from an image and output coordinate values;

extracting local feature descriptors from local regions centered on the coordinate values of the feature points;

converting the coordinate values into index values according to a specific scanning method;

sorting the index values;

calculating a differential value between two adjacent index values of the sorted index values and output a sequence of differential values;

encoding the sequence of the differential values in a sequential permutation; and encoding the local feature descriptors of the corresponding feature points in the same permutation as that of the sorted index values, wherein said encoding of the sequence of the differential values includes:

performing M-bit fixed-length encoding by encoding the differential value when the differential value is in an encodable value area, and by encoding an escape code indicating that the differential value is outside the encodable value area when the differential value is outside the encodable value area;

performing N-bit fixed length encoding by encoding the differential by encoding method different from that of the first encoding unit when the first encoding unit has encoded the escape code, N being larger than M; and determining M and N from the sequence of the differential values such that a code length of the sequence of the encoded differential values is the shortest.

6. A non-transitory computer-readable storage medium storing a program for causing a computer to realize.

\* \* \* \* \*